United States Patent
Kawasaki

(10) Patent No.: US 10,264,613 B2
(45) Date of Patent: Apr. 16, 2019

(54) WIRELESS COMMUNICATION SYSTEM, WIRELESS DEVICE, METHOD OF COMMUNICATIONS BY WIRELESS DEVICE, WIRELESS BASE STATION, AND METHOD OF COMMUNICATIONS BY WIRELESS BASE STATION

(71) Applicant: FUJITSU CONNECTED TECHNOLOGIES LIMITED, Kawasaki-shi, Kanagawa (JP)

(72) Inventor: Yoshihiro Kawasaki, Kawasaki (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 134 days.

(21) Appl. No.: 15/364,965

(22) Filed: Nov. 30, 2016

(65) Prior Publication Data
US 2017/0086239 A1 Mar. 23, 2017

Related U.S. Application Data

(63) Continuation of application No. PCT/JP2014/066549, filed on Jun. 23, 2014.

(51) Int. Cl.
*H04W 76/14* (2018.01)
*H04W 76/15* (2018.01)
(Continued)

(52) U.S. Cl.
CPC .......... *H04W 76/14* (2018.02); *H04B 17/336* (2015.01); *H04J 13/0062* (2013.01); *H04L 5/0044* (2013.01); *H04L 5/0053* (2013.01); *H04W 24/10* (2013.01); *H04W 52/241* (2013.01); *H04W 52/383* (2013.01); *H04W 72/0446* (2013.01); *H04W 72/0453* (2013.01); *H04W 72/08* (2013.01); *H04W 72/085* (2013.01); *H04W 76/15* (2018.02)

(58) Field of Classification Search
None
See application file for complete search history.

(56) References Cited

U.S. PATENT DOCUMENTS

| 2006/0165035 A1 | 7/2006 | Chandra et al. |
| 2010/0110999 A1 | 5/2010 | Li et al. |

(Continued)

FOREIGN PATENT DOCUMENTS

| JP | 2008-532346 A | 8/2008 |
| JP | 2010-93758 A | 4/2010 |

(Continued)

OTHER PUBLICATIONS

International Search Report issued for corresponding International Patent Application No. PCT/JP2014/066549, dated Sep. 9, 2014.

*Primary Examiner* — Saumit Shah
(74) *Attorney, Agent, or Firm* — Myers Wolin, LLC

(57) ABSTRACT

A wireless communication system includes a wireless base station and a plurality of wireless devices. One of the wireless devices sends a first signal to the wireless base station in accordance with a quality of a communication through a first wireless resource between the plurality of wireless devices, through a second wireless resource associated with the first wireless resource.

14 Claims, 18 Drawing Sheets

(51) Int. Cl.
*H04W 24/10* (2009.01)
*H04B 17/336* (2015.01)
*H04J 13/00* (2011.01)
*H04W 52/24* (2009.01)
*H04W 72/04* (2009.01)
*H04W 72/08* (2009.01)
*H04W 52/38* (2009.01)
*H04L 5/00* (2006.01)

(56) References Cited

U.S. PATENT DOCUMENTS

| | | |
|---|---|---|
| 2011/0176478 A1 | 7/2011 | Inohiza |
| 2012/0195263 A1 | 8/2012 | Chandra et al. |
| 2014/0038633 A1 | 2/2014 | Iwamura et al. |
| 2014/0044115 A1 | 2/2014 | Chandra et al. |
| 2014/0219095 A1* | 8/2014 | Lim ................ H04W 72/085 370/235 |
| 2014/0328329 A1* | 11/2014 | Novlan ............ H04W 72/042 370/336 |
| 2015/0195828 A1 | 7/2015 | Fujishiro et al. |
| 2015/0208453 A1 | 7/2015 | Yamazaki et al. |

FOREIGN PATENT DOCUMENTS

| | | |
|---|---|---|
| JP | 2012-507975 A | 3/2012 |
| JP | 2012-227884 A | 11/2012 |
| WO | 2014/017479 A1 | 1/2014 |
| WO | 2014/017498 A1 | 1/2014 |

* cited by examiner

WIRELESS COMMUNICATION SYSTEM, WIRELESS DEVICE, METHOD OF COMMUNICATIONS BY WIRELESS DEVICE, WIRELESS BASE STATION, AND METHOD OF COMMUNICATIONS BY WIRELESS BASE STATION

CROSS-REFERENCE TO RELATED APPLICATION

This application is a continuation application of International Application PCT/JP2014/066549, filed on Jun. 23, 2014 and designated the U.S., the entire contents of which are incorporated herein by reference.

FIELD

The embodiments discussed herein relate to a wireless communication system, a wireless device (or a wireless terminal), a method of communications by a wireless device, a wireless base station, and a method of communications by a wireless base station. More specifically, the embodiments discussed herein relate to a wireless communication system in which wireless devices carry out wireless communications directly, as well as device-to-device communications via a wireless base station, for example. The embodiments discussed herein are also applicable to the Long Term Evolution-Advanced (LTE-A) standards, for example, which have been formulated continuously in a developmental manner by the 3GPP that standardizes standards for mobile wireless communication systems.

BACKGROUND

In a wireless communication system including multiple wireless devices and a wireless base station, the multiple wireless devices carry out communications via the wireless base station, and also carry out direct communications without an intervention of the wireless base station (e.g., refer to Patent Documents 1 and 2). For example, direct communications between wireless devices are referred to as device-to-device (D2D) communications. In contrast, communications via the wireless base station are referred to as cellular communications, for example. The 3GPP that is a standardization body that has standardizes the LTE, which is one of wireless communication systems, has been continuously conducting study of D2D communication technologies to add them to the LTE-A standard.

Patent Document 1: Japanese National Publication of International Patent Application No. 2012-507975
Patent Document 2: WO 2014/017498

SUMMARY

In a wireless communication system as set forth above, however, the quality of wireless communications may be impaired due to interference caused by simultaneous wireless signal transmission in multiple different device-to-device communications that are carried out at the same time using a common (e.g., the same) wireless resource. As a result, wireless resources may be ineffectively used in the multiple different device-to-device communications.

In one aspect, a wireless communication system includes a wireless base station and a plurality of wireless devices. One of the wireless devices transmits a first signal to the wireless base station in accordance with a quality of a device-to-device communication (in other words, communication between wireless devices) through a first wireless resource, through a second wireless resource associated with the first wireless resource.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
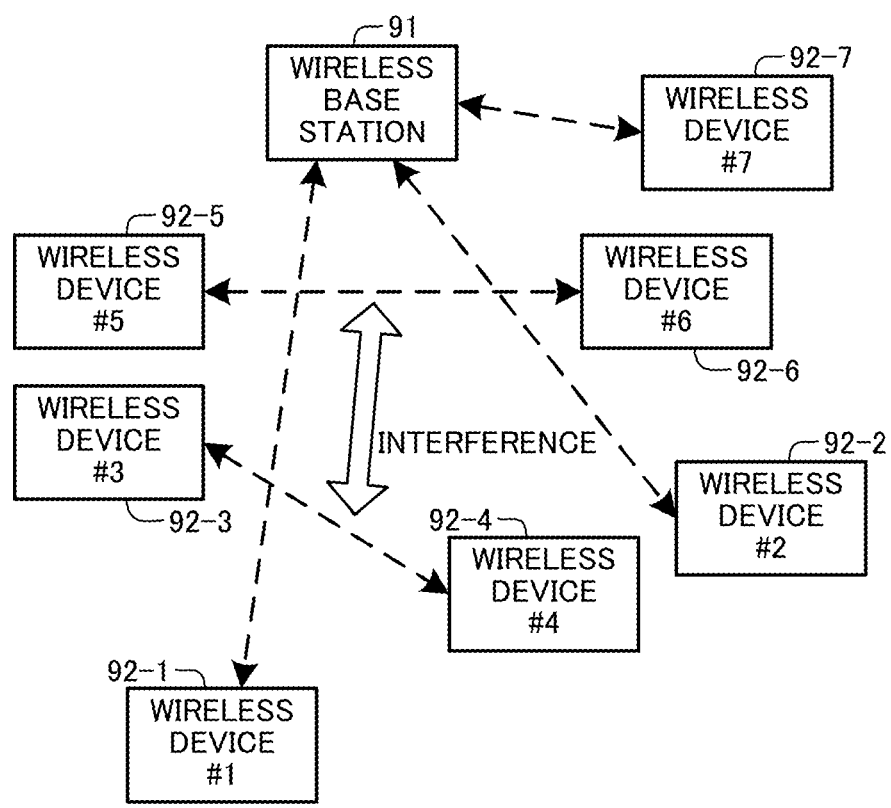
FIG. 1 is an illustrative diagram conceptually illustrating one example of a status of a wireless communication system in which multiple D2D communications are carried out in parallel.

Hereinafter, embodiments of the present disclosure will be described with reference to the drawings. The embodiments described below are merely exemplary. Accordingly, a various modifications and applications of techniques to the embodiment are not excluded. In the drawings illustrating the embodiments described below, like reference symbols denote the same or similar elements, unless any modifications or variations are stated explicitly.

<First Embodiment>

As exemplified in FIG. 1, a wireless communication system that carries out D2D communications includes a wireless base station 91 and multiple wireless devices 92-1 through 92-7. The wireless device 92-i may also be denoted as the wireless device #i. As used herein, "i" represents an integer from 1 to 7.

When multiple D2D communications are carried out in parallel, wireless signals may interfere with each other in the multiple D2D communications. For example, when a wireless resource having a certain frequency band is allocated for multiple D2D communications, the quality of a D2D communication is reduced due to an interference as the distance between wireless devices executing the multiple D2D communications becomes smaller.

Figure 2:
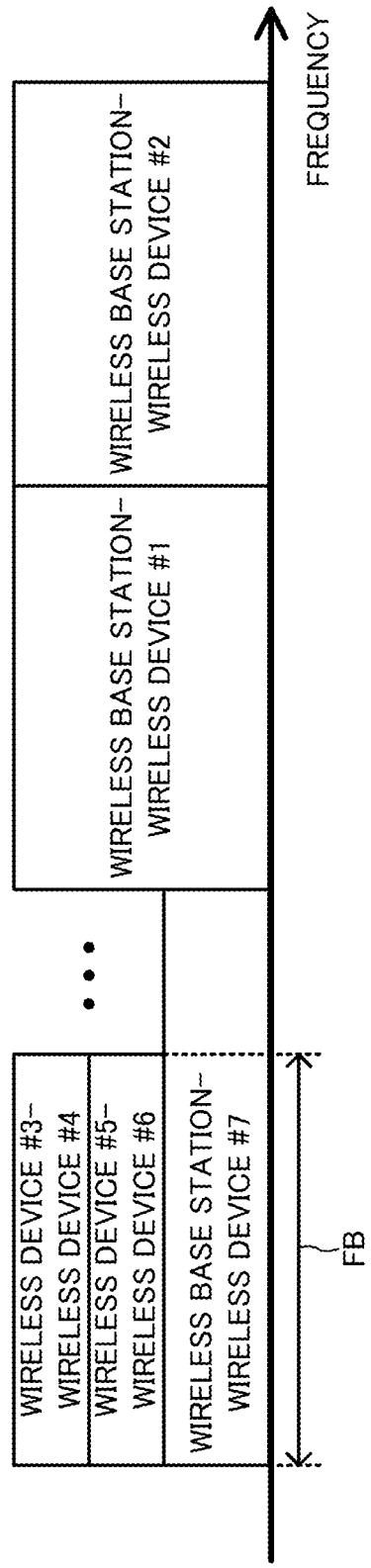
FIG. 2 is an illustrative diagram conceptually illustrating one example of a frequency band allocated to a D2D communication and a cellular communication.

In the example in FIG. 2, a wireless resource having a frequency band FB is allocated for a D2D communication between the wireless device #3 and the wireless device #4, a D2D communication between the wireless device #5 and the wireless device #6, and a communication between the wireless base station and the wireless device #7. In this case, the quality of a D2D communication is reduced due to an interference as the distance between the wireless device #3 and the wireless device #5 becomes smaller, for example.

One idea to control an interference among multiple D2D communications is to control the D2D communications (e.g., control transmission powers) autonomously by the wireless devices #3-#6 based on the quality of the D2D communications. In this technique, since the wireless base station 91 does not continuously control the D2D communications directly, controlling the quality of communications between the wireless base station 91 and the wireless device #7 is difficult.

Another idea is to control D2D communications by the wireless base station 91. In this case, however, the wireless base station 91 is required to obtain information on the quality of the D2D communications from the wireless devices #3-#6. To send signals containing the information on the qualities of the D2D communications from the wireless devices #3-#6, respective wireless resources are allocated to the wireless devices #3-#6.

In this case, more wireless resources are needed to be allocated as the number of D2D communications increases. Wireless resources available for sending data signals are reduced due to this increase. As a result, an effective utilization of wireless resources may not be achieved.

In contrast, in a wireless communication system in accordance with a first embodiment, one of wireless devices sends a first signal to a wireless base station in accordance with a quality of a D2D communication through a first wireless resource, through a second wireless resource associated with the first wireless resource. In this configuration, even when the wireless base station controls the quality of the D2D communication, an effective utilization of wireless resources is achieved.

Hereinafter, the wireless communication system in accordance with the first embodiment will be described in detail.

(Configuration)

Figure 3:
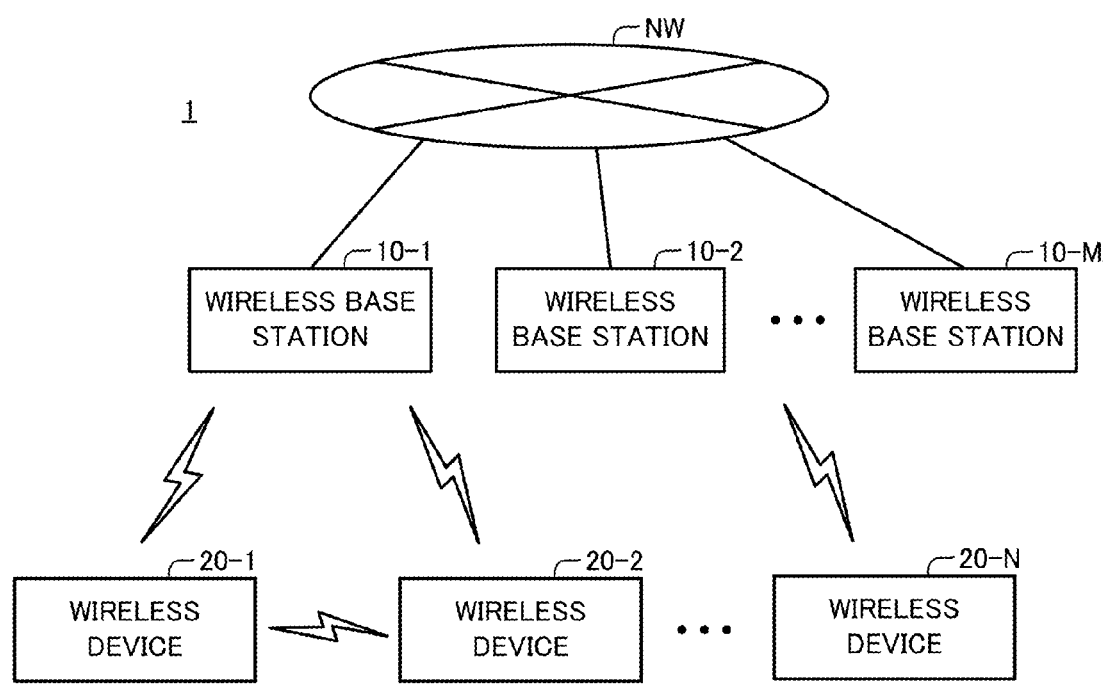
FIG. 3 is a block diagram depicting an example of a configuration of a wireless communication system in accordance with a first embodiment.

As depicted in FIG. 3, a wireless communication system 1 in accordance with the first embodiment includes M wireless base stations 10-1, 10-2, . . . , 10-M and N wireless devices 20-1, 20-2, . . . , 20-N, as an example.

In this example, M represents an integer of 1 or greater. Hereinafter, the wireless base station 10-m may also be referred to as the wireless base station 10, when no distinction is made among them (m represents an integer from 1 to M). In this example, N represents an integer of 2 or greater. Hereinafter, the wireless device 20-n may also be referred to as the wireless device 20 when no distinction is made among them (n represents an integer from 1 to N).

The wireless communication system 1 carries out wireless communications among the wireless base station 10 and the wireless device 20, compliant with a predefined wireless communication scheme. For example, the wireless communication scheme is the LTE-Advanced. LTE is an abbreviation for the Long Term Evolution. Note that the wireless communication scheme may be any scheme other than the LTE-Advanced (e.g., schemes such as the LTE or WiMAX®). WiMAX is an abbreviation for the Worldwide Interoperability for Microwave Access.

In this example, each wireless base station 10 forms a single wireless area. Note that each wireless base station 10 may form multiple wireless areas. The wireless area may also be referred to as wireless cell, coverage area, or communication area. For example, the wireless area is a cell, such as a macro cell, a micro cell, a nano cell, a pico cell, a femto cell, a home cell, or a sector cell.

Alternatively, each wireless base station 10 may be an Evolved Node B (eNB), a Node B (NB), a macro wireless base station, a micro wireless base station, a nano wireless base station, a pico wireless base station, a femto wireless base station, or a home wireless base station.

In this example, each wireless base station 10 is connected to a communication network (e.g., a core network) NW that permits wired communications. Note that each wireless base station 10 may be connected to a communication network NW that permits wireless communications. The interface among the wireless base stations 10 and the communication network NW may be referred to as the S1 interface. Further, the interface between the wireless base stations 10 may be referred to as the X2 interface.

The wireless base stations 10 and the part (i.e., the upstream) of the wireless communication system 1 on the side of the communication network NW relative to the wireless base stations 10 may be referred to as the E-UTRAN. E-UTRAN is an abbreviation for the Evolved Universal Terrestrial Radio Access Network.

In this example, the wireless device 20 may be referred to as wireless apparatus, mobile station, mobile terminal, terminal device, or user equipment (UE). For example, the wireless device 20 is a cell phone, a smartphone, a sensor, a meter (measurement device), and the like. The wireless device 20 may be carried by a user, or installed in a moving object, such as a vehicle, or may be stationary.

Each wireless base station 10 allocates a wireless resource for communications to be carried out in a wireless area formed by that wireless base station 10. In this example, the wireless resources are identified by time and frequencies. In the wireless area, the wireless device 20 carries out a cellular communication and a direct communication through a wireless resource allocated by the wireless base station 10 forming that wireless area. The cellular communication is a communication between wireless devices 20 via a wireless base station 10. The direct communication is a communication between wireless devices 20 without an intervention of a wireless base station 10. The direct communication may be referred to as D2D communication or device-to-device communication.

Note that in this example, the fact that a wireless device 20 can communicate with a wireless base station 10 through a wireless resource allocated by that wireless base station 10 in a wireless area formed by that wireless base station 10 is one example of the wireless device 20 being connected to the wireless base station 10.

Figure 4:
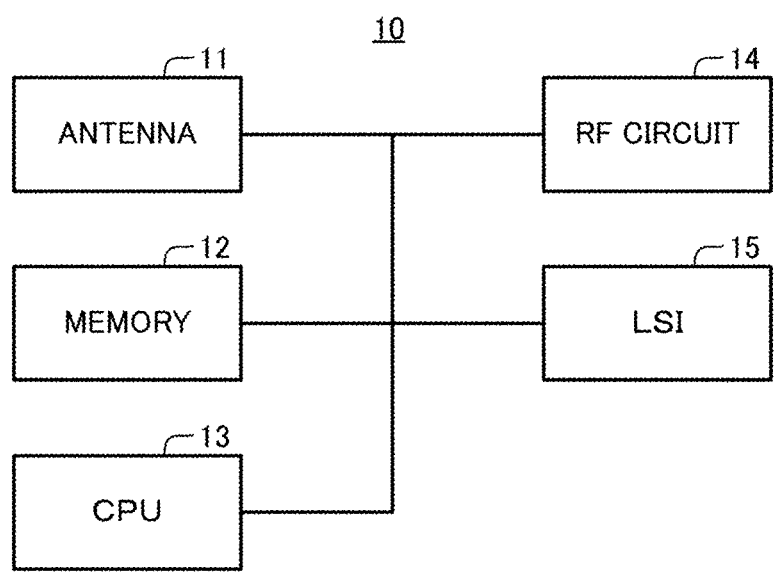
FIG. 4 is a block diagram depicting one example of a configuration of the wireless base station depicted in FIG. 3.

As depicted in FIG. 4, a wireless base station 10 includes an antenna 11, a memory 12, a CPU 13, an RF circuit 14, and an LSI 15, as an example. CPU is an abbreviation for a central processing unit. RF is an abbreviation for a radio frequency. LSI is an abbreviation for a large scale integration.

The memory 12 stores information in a readable and writable manner. For example, the memory 12 may be a RAM, a semiconductor memory, or an organic memory. RAM is an abbreviation for a random access memory. The memory 12 may include a ROM. ROM is an abbreviation for a read only memory.

The CPU 13 controls the antenna 11, the memory 12, the RF circuit 14, and the LSI 15 by executing a program stored in the memory 12.

The RF circuit 14 sends and receives wireless signals via the antenna 11. In this example, transmissions and receptions of wireless signals involve conversions from digital signals to analog signals and vise verse, frequency conversions, and amplifications of the wireless signals.

The LSI 15 processes a digital signal for carrying out a wireless communication. The LSI 15 outputs the digital signal to the RF circuit 14, from which a wireless signal to be sent is generated. The LSI 15 receives the digital signal based on the received wireless signal from the RF circuit 14. Note that the LSI 15 may include a programmable logic device (PLD).

Figure 5:
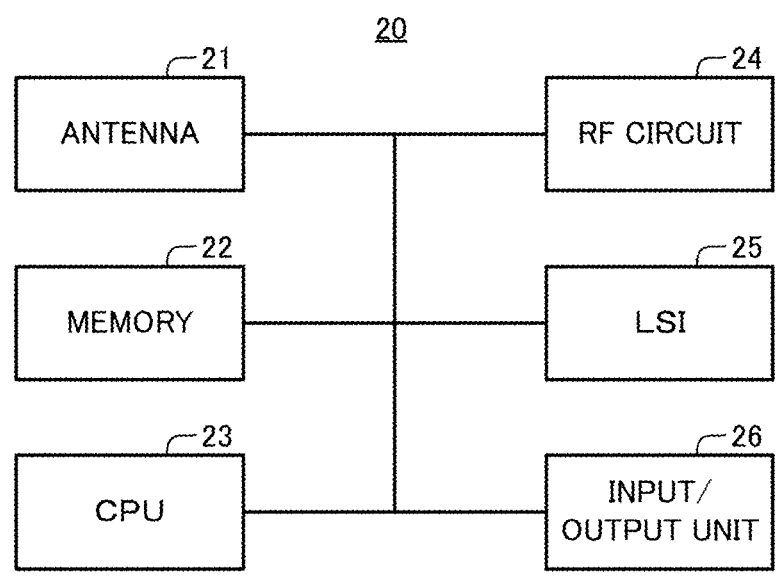
FIG. 5 is a block diagram depicting one example of a configuration of the wireless device depicted in FIG. 3.

As depicted in FIG. 5, a wireless device 20 includes, an antenna 21, a memory 22, a CPU 23, an RF circuit 24, an LSI 25, an input/output unit 26, as an example. In this example, the memory 22, the CPU 23, the RF circuit 24, and the LSI 25 have functions similar to those of the memory 12, the CPU 13, the RF circuit 14, and the LSI 15, respectively.

The input/output unit 26 receives information. For example, the information may be entered by a user of the wireless device 20. The input/output unit 26 also outputs information. In this example, the input/output unit 26 is a touch panel type display. In addition to the display, the input/output unit 26 may also include key buttons. The input/output unit 26 may also include a display in a type other than the touch panel type.

(Functions)

Figure 6:
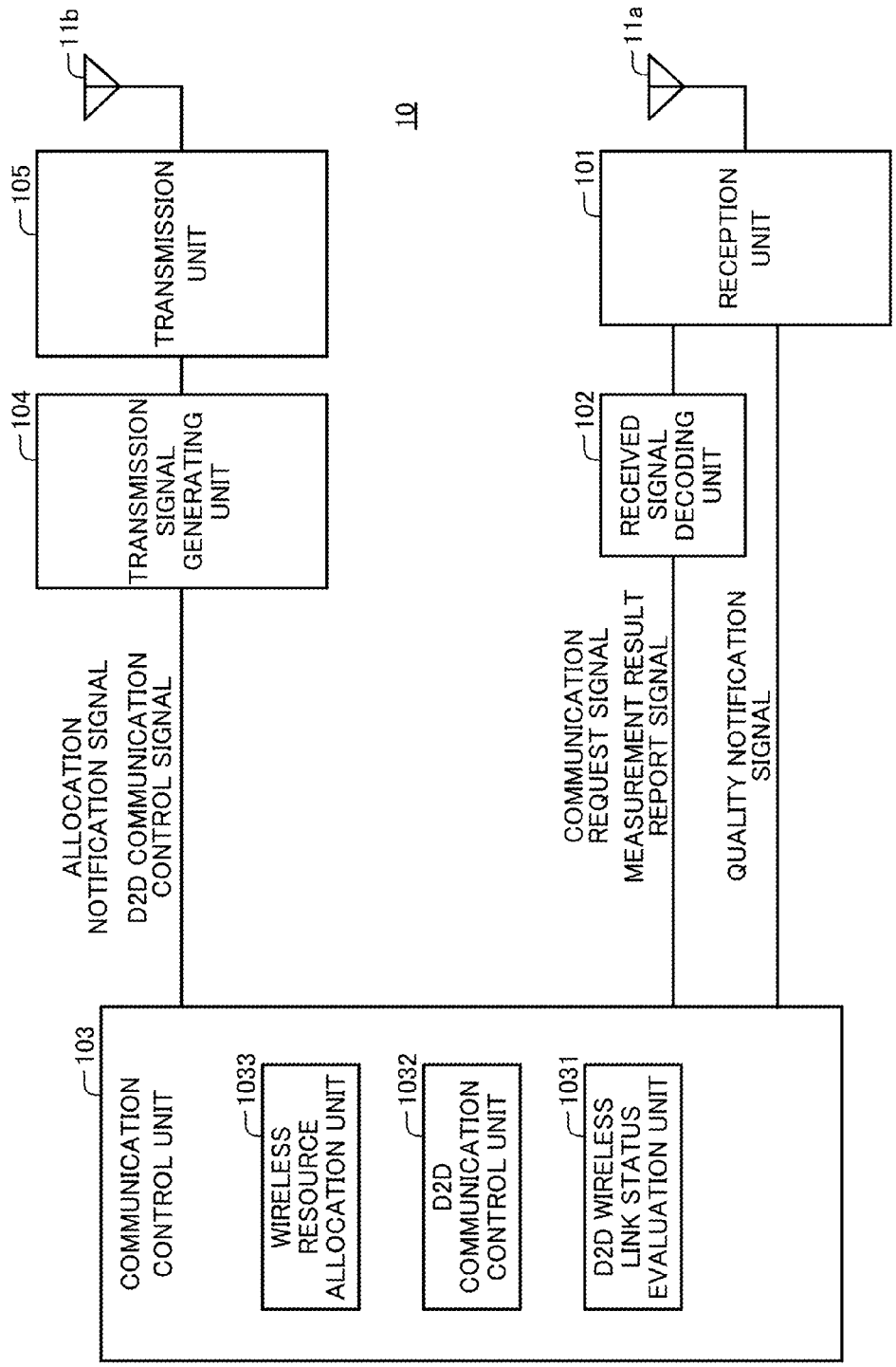
FIG. 6 is a block diagram depicting one example of functions of the wireless base station depicted in FIG. 3.

As exemplified in FIG. 6, a wireless base station 10 includes a reception unit 101, a received signal decoding unit 102, a communication control unit 103, a transmission signal generating unit 104, and a transmission unit 105, as its functions.

In this example, the reception unit 101 and the transmission unit 105 are embodied by the RF circuit 14. Further, in this example, the antenna 11 includes a reception antenna 11a and a transmission antenna 11b. Note that the antenna 11 may include a duplexer, and a single antenna may be used for both transmissions and receptions with an assistance of the duplexer.

In this example, the functional units 102-104 of the functions of a wireless base station 10, other than the reception unit 101 and the transmission unit 105, are embodied by the LSI 15. Note that at least some of the functional units 102-104 may also be embodied by the CPU 13 and the memory 12.

The reception unit 101 executes reception processing on a wireless signal received via the reception antenna 11a, and outputs the result of the processing to the received signal decoding unit 102 as a received signal. For example, the reception processing involves an amplification of the wireless signal, a conversion from the wireless frequency to the base frequency (i.e., down conversion), a conversion from an analog signal to a digital signal.

The received signal decoding unit 102 executes demodulation and decoding processing on the received signal output from the reception unit 101. In this example, the demodulation and decoding processing involves processing for demodulating the received signal, and error correction decoding processing based on the error correction encoding applied to the received signal. Note that the demodulation and decoding processing may involve error detection processing based on the error detection encoding applied to the received signal.

The received signal decoding unit 102 outputs the processed received signal to the communication control unit 103. In this example, the received signal output from the received signal decoding unit 102 contains a communication request signal and a measurement result report signal.

In this example, the communication request signal requests a communication between wireless devices 20. For example, the communication request signal contains two device identifiers respectively identifying two wireless devices 20 to communicate to each other. The communication request signal also contains the identifier of a wireless device to which the wireless device 20 wishes to carry out a D2D communication. As will be described later, communication request signals are sent by the wireless devices 20.

In this example, the measurement result report signal indicates the power of a discovery signal measured by the wireless device 20, which has been sent from another wireless device 20 and then received by that wireless device 20. For example, a discovery signal is used to discover a wireless device 20 that is able to carry out a D2D communication.

Note that the wireless communication system 1 may also employ a beacon signal or a reference signal as a signal to be measured, instead of a discovery signal. In the present example, the measurement result report signal contains a device identifier identifying a wireless device 20 that is the sender of a discovery signal, and a device identifier identifying a wireless device 20 that has measured a received power.

The communication control unit 103 includes a D2D wireless link status evaluation unit 1031, a D2D communication control unit 1032, and a wireless resource allocation unit 1033, as one example. The wireless resource allocation unit 1033 is one example of a control unit adapted to control an allocation of a wireless resource for a D2D communication.

In response to receiving a communication request signal, the D2D wireless link status evaluation unit 1031 selects either a D2D communication or a cellular communication (a communication which is always intervened by a wireless base station in a device-to-device data communication and wireless data signals are always routed by the wireless base station), based on the measurement result report signal.

In this example, the D2D wireless link status evaluation unit 1031 selects a D2D communication when the measurement result report signal indicates that a received power of the discovery signal that has been sent and received between the two wireless devices 20 identified by the communication request signal is greater than a certain first threshold power. Otherwise, the D2D wireless link status evaluation unit 1031 selects a cellular communication when the measurement result report signal indicates that the received power is smaller than the first threshold power. Note that the criteria used for determining whether to select a D2D communication or not may be based on information other than the received power.

The wireless resource allocation unit 1033 allocates a wireless resource for a cellular communication to the wireless device 20 when a cellular communication is selected. In this example, wireless resources are identified by time and frequencies. The wireless resource allocation unit 1033 outputs an allocation notification signal for identifying the allocated wireless resource, to the transmission signal generating unit 104.

The wireless resource allocation unit 1033 allocates a wireless resource for a D2D communication to the wireless device 20, when a D2D communication is selected. The wireless resource allocated for a D2D communication may be referred to as the D2D communication resource. The D2D communication resource is one example of the first wireless resource.

The wireless resource allocation unit 1033 outputs an allocation notification signal for identifying the D2D communication resource, to the transmission signal generating unit 104. In this example, an allocation notification signal when a D2D communication is selected contains a band identifier identifying a frequency band identifying a D2D communication resource, as information identifying that D2D communication resource. The band identifier may be referred to as a sub-band ID. The information identifying the D2D communication resource may also be an identifier of a unit wireless resource composing the sub-band, or information associated with that identifier. The unit wireless resource is referred to as a resource block in the LTE.

In this example, the duration identifying the D2D communication resource is defined in advance. For example, the wireless base station 10 and the wireless device 20 share a rule for determining the duration identifying the D2D communication resource in advance. As a result, the wireless device 20 can identify the D2D communication resource, from the band identifier notified from the wireless base station 10.

When no duration identifying the D2D communication resource is defined in advance, an allocation notification signal may contain a duration identifier identifying the duration.

Furthermore, when a D2D communication is selected, the wireless resource allocation unit 1033 allocates a wireless resource associated with the D2D communication resource, to sending of a quality notification signal from the wireless device 20 to the wireless base station 10. In this example, the quality notification signal indicates that the quality of the D2D communication is lower than a certain threshold quality (in other words, a certain level of quality). As will be described later, a quality notification signal is sent from the wireless device 20, in accordance with the quality of the D2D communication. The quality notification signal is one example of the first signal. The wireless resource allocated to sending of the quality notification signal may be referred to as the quality notification resource. The quality notification resource is one example of the second wireless resource.

In this example, the frequency band of the quality notification resource may be within or outside of the frequency band of D2D communication resource.

In this example, the duration identifying the quality notification resource is defined in advance. For example, the wireless base station 10 and the wireless device 20 share a rule for determining the duration identifying the quality notification resource in advance. As a result, the wireless device 20 can identify the quality notification resource, from the band identifier notified from the wireless base station 10.

When no duration identifying the quality notification resource is defined in advance, an allocation notification signal may contain a duration identifier identifying the duration.

In addition, when a D2D communication is selected, the wireless resource allocation unit 1033 allocates a wireless resource associated with the D2D communication resource to sending of a D2D communication control signal from the wireless base station 10 to the wireless device 20. In this example, the D2D communication control signal is a signal for controlling a D2D communication. A D2D communication control signal is sent by the wireless base station 10, as will be described later. The D2D communication control signal is one example of the second signal. The wireless resource allocated to sending of the D2D communication control signal may be referred to as the D2D communication control resource. The D2D communication control resource is one example of the third wireless resource.

In this example, the frequency band of D2D communication control resource is different from the frequency band of D2D communication resource. In this example, the relationship between the frequency band identifying the D2D communication control resource and the frequency band identifying the D2D communication resource is defined in advance. For example, the wireless base station 10 and the wireless device 20 may share a rule for determining the frequency band of D2D communication control resource based on the frequency band of D2D communication resource in advance.

Note that the frequency band of D2D communication control resource may be within or outside of the frequency band of D2D communication resource.

Further, in this example, the duration identifying the D2D communication control resource is defined in advance. For example, the wireless base station 10 and the wireless device 20 share a rule for determining the duration identifying the D2D communication control resource in advance.

As a result, a wireless device 20 can identify the D2D communication control resource, from the band identifier notified from the wireless base station 10.

When no duration identifying the D2D communication control resource is defined in advance, an allocation notification signal may contain a duration identifier identifying the duration. Further, when the relationship between the frequency band identifying the D2D communication control resource and the frequency band identifying the D2D communication resource have not been defined in advance, an allocation notification signal may contain a band identifier identifying the frequency band by which the D2D communication control resource is identified.

As described above, determining the band identifier for a D2D communication is one example of allocating the D2D communication resource, the quality notification resource, and the D2D communication control resource.

Further, in this example, when a D2D communication is selected, an allocation notification signal contains information indicating a D2D communication. The information indicating a D2D communication may be a D2D-RNTI, for example. D2D-RNTI is an abbreviation for a device-to-device radio network temporary identifier. A certain code sequence (e.g., a CRC) contained in the allocation notification signal may be scrambled with a code sequence of the D2D-RNTI. CRC is an abbreviation for a cyclic redundancy check.

In this example, for multiple D2D communications by different communication pairs, the wireless resource allocation unit 1033 may determine a band identifier that is common to those multiple D2D communications. In this example, the communication pair is a pair of wireless devices 20 that carry out a D2D communication to each other. Note that a D2D communication may be carried out among three or more wireless devices 20. For example, a D2D signal sent from one wireless device 20 may be received by multiple other wireless devices simultaneously.

Figure 7:
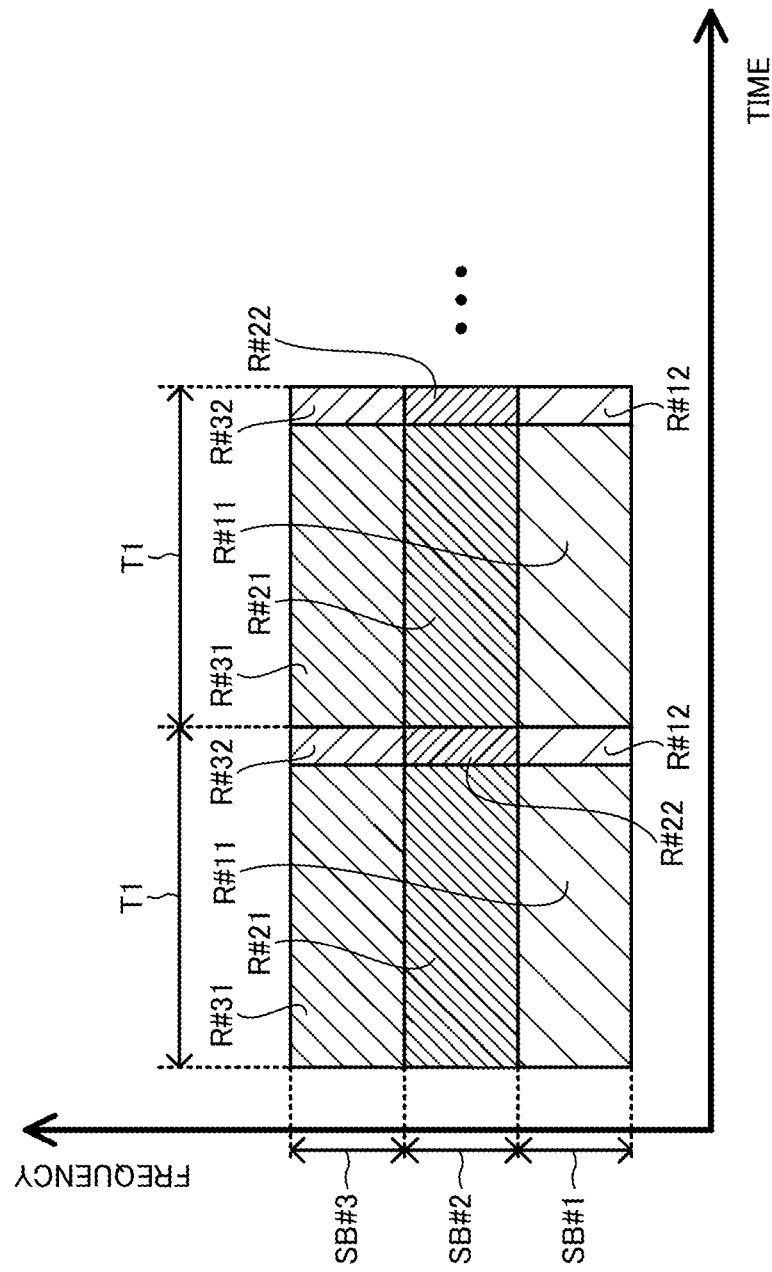
FIG. 7 is an illustrative diagram conceptually illustrating one example of an allocation of D2D communication resources and quality notification resources.

For example, as exemplified in FIG. 7, the wireless resource allocation unit 1033 determines band identifiers identifying $1^{st}$-$3^{rd}$ frequency bands SB#1-SB#3, for $1^{st}$-$3^{rd}$ D2D communications, respectively. While the wireless resource allocation unit 1033 allocates three frequency bands for the D2D communications in this example, two or less frequency bands or four or more frequency bands may be allocated for the D2D communications.

In this example, D2D communication resources R#11, R#21, and R#31 for the $1^{st}$-$3^{rd}$ D2D communications are identified by the $1^{st}$-$3^{rd}$ frequency bands SB#1-SB#3, respectively.

Further, in this example, quality notification resources R#12, R#22, and R#32 for the $1^{st}$-$3^{rd}$ D2D communications are identified by the $1^{st}$-$3^{rd}$ frequency bands SB#1-SB#3, respectively. Alternatively, the quality notification resources R#12, R#22, and R#32 for the $1^{st}$-$3^{rd}$ D2D communications may be identified by frequency bands other than the $1^{st}$-$3^{rd}$ frequency bands SB#1-SB#3, respectively.

In the present example, each of the D2D communication resources R#11, R#21, and R#31 is identified by a duration defined at every certain cycle T1. In other words, each of the D2D communication resources R#11, R#21, and R#31 is cyclically (in other words, periodically) allocated along the time line (in other words, in the time domain). In other words, each of the D2D communication resources R#11, R#21, and R#31 is positioned cyclically along the time line. Further, in this example, each of the quality notification resources R#12, R#22, and R#32 is identified by a duration defined at every cycle T1. In other words, each of the quality notification resources R#12, R#22, and R#32 is cyclically allocated along the time line. In other words, each of the quality notification resources R#12, R#22, and R#32 is positioned cyclically along the time line.

In this example, the quality notification resources R#12, R#22, and R#32 are identified by frequency bands common to the D2D communication resources R#11, R#21, and R#31, respectively. Further, the quality notification resources R#12, R#22, and R#32 follow the D2D communication resources R#11, R#21, and R#31, respectively, along the time line.

Figure 8:
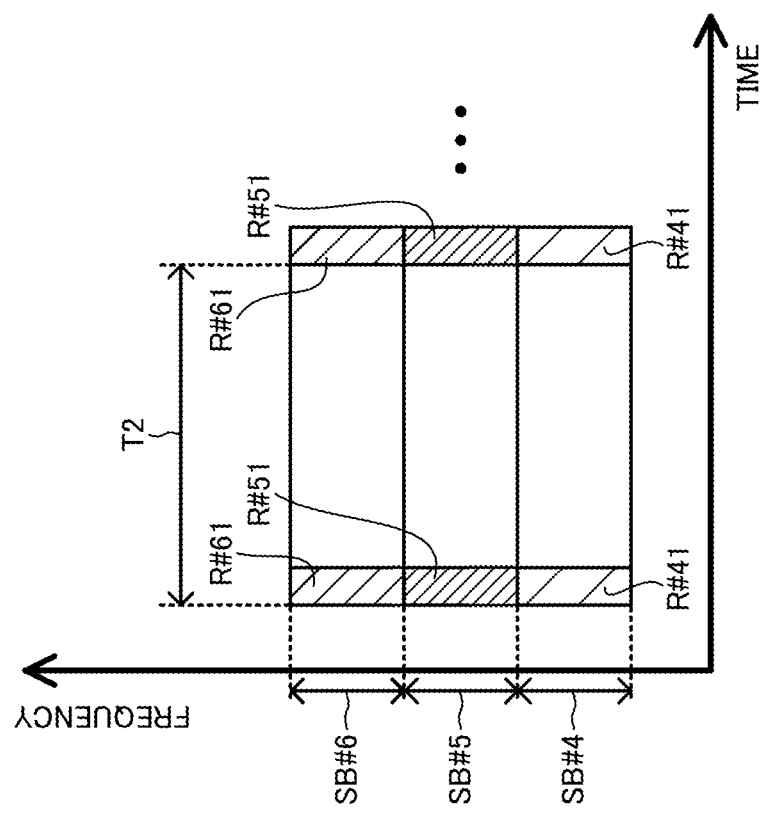
FIG. 8 is an illustrative diagram conceptually illustrating one example of an allocation of D2D communication control resources.

In this example, as depicted in FIG. 8, D2D communication control resources R#41, R#51, and R#61 for the $1^{st}$-$3^{rd}$ D2D communications are identified by $4^{th}$-$6^{th}$ frequency bands SB#4-SB#6, respectively.

In this example, each of the D2D communication control resources R#41, R#51, and R#61 is identified by a duration defined at every certain cycle T2. In other words, each of the D2D communication control resources R#41, R#51, and R#61 is cyclically allocated along the time line. In other words, each of the D2D communication control resources R#41, R#51, and R#61 is positioned cyclically along the time line. The cycle T2 may be equal to the cycle T1. Alternatively, the cycle T2 may be different from the cycle T1.

In this example, the relationship between the frequency band identifying the D2D communication resource and the frequency band identifying the D2D communication control resource is defined such that the frequency band SB#1 identifying the D2D communication resource and the frequency band SB#4 identifying the D2D communication control resource are associated with each other. In this example, the above-described relationship is also defined such that the frequency band SB#2 identifying the D2D communication resource and the frequency band SB#5 identifying the D2D communication control resource are associated with each other. Further, in this example, the above-described relationship is also defined such that the frequency band SB#3 identifying the D2D communication resource and the frequency band SB#6 identifying the D2D communication control resource are associated with each other.

The D2D communication control unit 1032 obtains a received power for the quality notification resource of a signal received by the reception unit 101. As will be described later, the received power for the quality notification resource increases, as the number of wireless devices 20 sending quality notification signals increases. The D2D communication control unit 1032 outputs a D2D communication control signal for inhibiting a D2D communication, to the transmission signal generating unit 104, when the obtained received power is greater than a certain second threshold power. The D2D communication control unit 1032 does not output a D2D communication control signal for inhibiting a D2D communication when the obtained received power is smaller than the above-described second threshold power.

The transmission signal generating unit 104 executes encoding and modulation processing on the control signal output from the communication control unit 103. For example, the control signal includes an allocation notification signal and a D2D communication control signal. In this example, the encoding and modulation processing involves processing for applying error correction encoding to the control signal and processing for modulating the control signal. Note that the encoding and modulation processing may involve processing for applying error detection encoding to the control signal.

In this example, in response to receiving an allocation notification signal, the transmission signal generating unit 104 outputs the allocation notification signal to the transmission unit 105. Further, in this example, in response to receiving a D2D communication control signal, the transmission signal generating unit 104 outputs the D2D communication control signal to the transmission unit 105.

In this case, the D2D communication control signal is output such that the D2D communication control signal is sent through a D2D communication control resource. As described above, the D2D communication control resource used for sending a D2D communication control signal is a wireless resource associated with a D2D communication resource allocated for a D2D communication that is to be controlled with the D2D communication control signal.

The transmission unit 105 executes transmission processing on the signal output from the transmission signal generating unit 104, and sends the resultant wireless signal via the transmission antenna 11b. For example, the transmission processing involves a conversion from a digital signal to an analog signal, a conversion from the base frequency to the wireless frequency (i.e., up conversion), and an amplification of the wireless signal.

Figure 9:
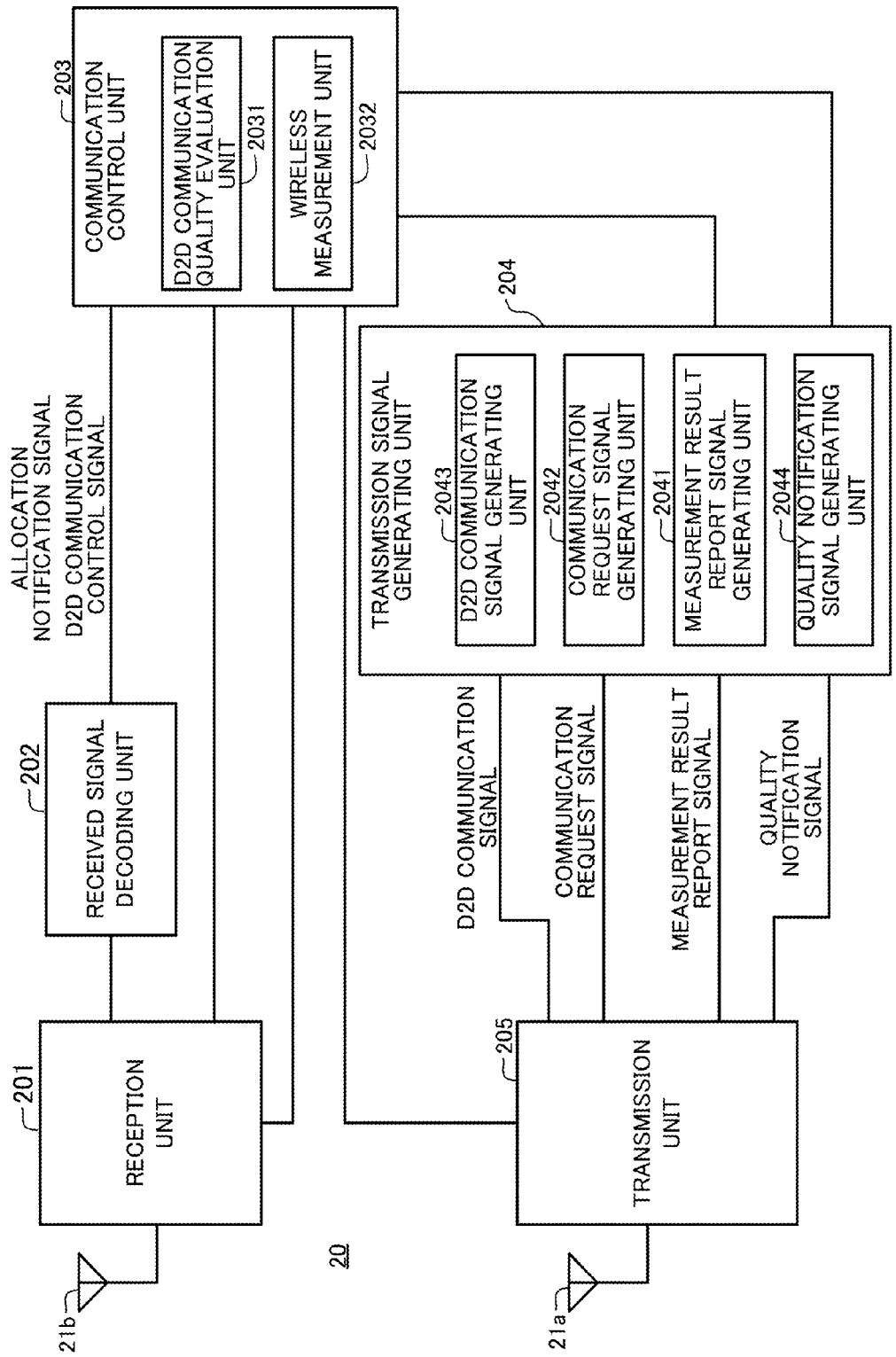
FIG. 9 is a block diagram depicting one example of functions of the wireless device depicted in FIG. 3.

As exemplified in FIG. 9, the wireless device 20 includes a reception unit 201, a received signal decoding unit 202, a communication control unit 203, a transmission signal generating unit 204, and a transmission unit 205, as its functions.

In this example, the reception unit 201 and the transmission unit 205 are embodied by the RF circuit 24. Further, in this example, the antenna 21 includes a reception antenna 21a and a transmission antenna 21b. Note that the antenna 21 may include a duplexer, and a single antenna may be used for both transmissions and receptions with an assistance of the duplexer.

In this example, the functional units 202-204 of the functions of a wireless device 20, other than the reception unit 201 and the transmission unit 205, are embodied by the LSI 25. Note that at least some of the functional units 202-204 may also be embodied by the CPU 23 and the memory 22.

The reception unit 201 executes reception processing on a wireless signal received via the reception antenna 21a, and outputs the result of the processing to the received signal decoding unit 202, as a received signal.

The received signal decoding unit 202 executes demodulation and decoding processing on the received signal output from the reception unit 201. The received signal decoding unit 202 outputs the processed received signal to the communication control unit 203. In this example, the received signal output from the received signal decoding unit 202 contains an allocation notification signal and a D2D communication control signal.

The communication control unit 203 executes a control to inhibit a D2D communication, in response to receiving a D2D communication control signal for inhibiting a D2D communication. A control to inhibit a D2D communication may be referred to as an inhibition control. An inhibition control may involve a control to reduce the transmission power by a certain value. Therefore, a D2D communication control signal is one example of a signal containing information about adjusting the transmission power of wireless signal transmitted by a wireless device 20.

An inhibition control may involve a control to limit a wireless resource used for a D2D communication to a part of the D2D communication resource. An inhibition control may involve a control to limit a wireless resource used for a D2D communication to a part of the frequency band identifying the D2D communication resource.

An inhibition control may involve a control to limit a wireless resource used for a D2D communication to a part of the duration identifying the D2D communication resource. When a D2D communication is carried out at every certain cycle, an inhibition control may involve a control to lengthen that cycle. An inhibition control may involve a control to vary communication timing of D2D communications for different D2D communications. The control to vary the communication timing for different D2D communications may be a control to vary the communication timing by randomly-determined time. For example, the varied time may be determined using a pseudo-random number. The varied time may be referred to as a back-off time.

Note that a D2D communication control signal for inhibiting a D2D communication may contain information indicating a description of an inhibition control. In this case, the communication control unit 203 may execute an inhibition control, in accordance with the information contained in the D2D communication control signal. For example, the description of an inhibition control may include either or both of an adjustment of the transmission power and an amount of the transmission power to be adjusted.

When the D2D communication control signal contains no information indicating a description of an inhibition control, the wireless device 20 executes an inhibition control of a predefined description. An inhibition control may also referred to as an inhibition operation. The description of the predefined inhibition operation may be notified by the wireless base station 10 to the wireless device 20, in the process during which the communication schemes of the wireless device 20 is changed from a cellular communication to a D2D communication.

Furthermore, a D2D communication control signal for inhibiting a D2D communication may contain information indicating a time duration during which an inhibition control is executed. In this case, the communication control unit 203 may terminate the inhibition control, in accordance with the information contained in the D2D communication control signal.

The wireless base station 10 may also send the wireless device 20 a control signal to instruct termination of the inhibition control.

The communication control unit 203 further includes a D2D communication quality evaluation unit 2031 and a wireless measurement unit 2032, as one example. The D2D communication quality evaluation unit 2031 is one example of a detection unit adapted to detect the quality of the D2D communication.

The D2D communication quality evaluation unit 2031 detects the quality of the D2D communication, and determines whether or not the detected quality is lower than a certain threshold quality.

For example, the quality of the D2D communication is represented by a retransmission count during a D2D communication when an MCS is set to a value where the transmission rate is the lowest. MCS is an abbreviation for a modulation and coding scheme, indicating a combination of a modulation scheme and a coded rate. For example, the retransmission count may be a retransmission count of particular data. The retransmission count may also be a retransmission count of any data. A retransmission count during a D2D communication exceeding a certain threshold count when an MCS is set to a value where the transmission rate is the lowest is one example of a quality lower than the threshold quality.

Note that the quality of the D2D communication may be represented by a retransmission count during a D2D communication, which is not based on an MCS value.

The quality of the D2D communication may also be represented by a bit error rate (BER). A bit error rate exceeding a certain threshold is one example of a quality lower than the threshold quality.

The quality of the D2D communication may also be represented by an SINR of a received wireless signal sent in the D2D communication. SINR is an abbreviation for a signal-to-interference plus noise power ratio. An SINR smaller than a certain threshold is one example of a quality lower than the threshold quality.

The quality of the D2D communication may also be represented by a reception SIR of a wireless signal sent in the D2D communication. SIR is an abbreviation for a signal to interference ratio. A reception SIR being smaller than a certain threshold is one example of a quality lower than the threshold quality.

The quality of the D2D communication may also be represented by an indicator (for example, channel quality indicator) indicating channel quality that is obtained from a result of measurement of a received wireless signal sent in the D2D communication. For example, in the LTE, a CQI determined by a certain wireless device from a result of wireless measurement for a received reference signal during a certain duration indicates an MCS value that is expected to assure a predetermined error rate in a wireless quality environment during that measurement duration.

The wireless measurement unit 2032 measures a received power of the reference signal (e.g., a discovery signal or a pilot signal) sent from another wireless device 20. A wireless resource allocated to sending of the discovery signal may be defined in advance.

The transmission signal generating unit 204 includes a measurement result report signal generating unit 2041, a communication request signal generating unit 2042, a D2D communication signal generating unit 2043, and a quality notification signal generating unit 2044, as one example.

The measurement result report signal generating unit 2041 generates a measurement result report signal indicating the received power measured by the wireless measurement unit 2032. In this example, the measurement result report signal contains a device identifier identifying a wireless device 20 that is a sender of a reference signal (e.g., a discovery signal or a pilot signal) to be measured, and a device identifier identifying the local wireless device 20.

The communication request signal generating unit 2042 generates a communication request signal. For example, the communication request signal generating unit 2042 may generate the communication request signal in response to an entry of information. For example, the information may be entered by a user of the wireless device 20. In this example, the communication request signal contains a device identifier identifying another wireless device 20 that is a communication counterpart to communicate with, and a device identifier identifying the local wireless device 20.

The D2D communication signal generating unit 2043 generates a D2D communication signal. The D2D communication signal is a signal sent and received in a D2D communication. In this example, the D2D communication signal contains a data signal representing user data, and a control signal for controlling the D2D communication.

The quality notification signal generating unit 2044 generates a quality notification signal, when it is determined by the D2D communication quality evaluation unit 2031 that the quality of the D2D communication is lower than the above-described threshold quality. Otherwise, the quality notification signal generating unit 2044 generates no quality notification signal when it is determined by the D2D communication quality evaluation unit 2031 that the quality of the D2D communication is higher than the above-described threshold quality. The quality notification signal generating unit 2044 may or may not generate a quality notification signal when it is determined that the quality of the D2D communication equals to the above-described threshold quality.

The transmission signal generating unit 204 executes encoding and modulation processing on the generated signal. For example, the generated signal contains a D2D communication signal, a communication request signal, a measurement result report signal, and a quality notification signal. In this example, in response to the generation of the signal, the transmission signal generating unit 204 outputs the generated signal to the transmission unit 205.

In this example, the transmission signal generating unit 204 executes an on-off keying (OOK) on the quality notification signal. Accordingly, in response to the generation of the quality notification signal, the transmission signal generating unit 204 outputs a signal corresponding to "on" of an on-off keying to the transmission unit 205, as a quality notification signal. The signal corresponding to "on" of an on-off keying may be a signal containing a carrier wave. As a signal for a quality notification, a code series, of which at least one of an auto-correlation characteristic and a cross-correlation characteristic is satisfactory, may be used. A code series, of which at least one of an auto-correlation characteristic and a cross-correlation characteristic is satisfactory, is a Zadoff-Chu sequence that is used in parts of wireless signals in the LTE, for example.

The quality notification signal is output from the transmission signal generating unit 204 to the transmission unit 205, so as to be sent by the transmission unit 205 through a quality notification resource. As described above, the quality notification resource used to send the quality notification signal is a wireless resource associated with a D2D communication resource allocated to a D2D communication, which is to be controlled with the quality notification signal.

Otherwise, when no quality notification signal is generated, the transmission signal generating unit 204 outputs a signal corresponding to "off" of an on-off keying to the transmission unit 205 such that that signal is sent through the quality notification resource. A signal corresponding to "off" of an on-off keying may be a signal without a carrier wave. For example, a signal corresponding to "off" of an on-off keying is a signal having an amplitude of zero.

Accordingly, the number of wireless devices 20 sending quality notification signals through a quality notification resource increases, as the number of wireless devices 20 experiencing a quality of a D2D communication lower than the threshold quality increases. Furthermore, a power received at the wireless base station 10 for the quality notification resource increases, as the number of wireless devices 20 sending quality notification signals increases.

A D2D communication signal is output from the transmission signal generating unit 204 to the transmission unit 205, so as to be sent by the transmission unit 205 through a D2D communication resource. The wireless resource allocated to sending of the measurement result report signal may be defined in advance. The wireless resource allocated to sending of a communication request signal may be defined in advance.

The transmission unit 205 executes transmission processing on the signal output from the transmission signal generating unit 204, and sends the resultant wireless signal via the transmission antenna 21b.

(Operations)

Initially, processing executed by each of the wireless base station 10 and the wireless device 20 will be described with reference to FIGS. 10-15.

Figure 10:
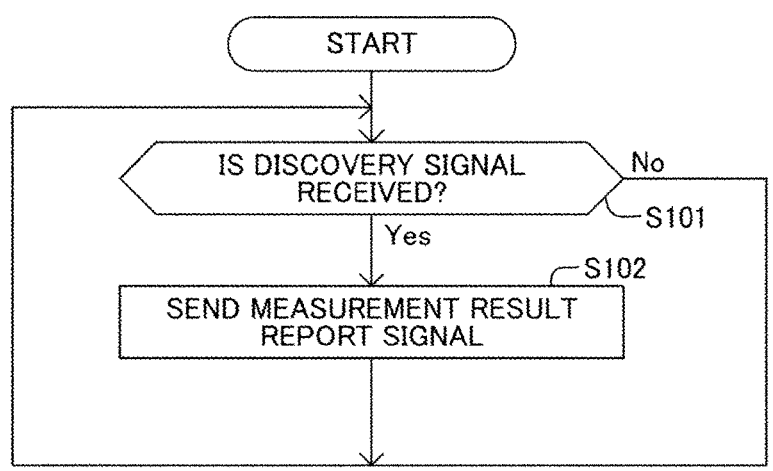
FIG. 10 is a flowchart illustrating one example of processing executed by the wireless device depicted in FIG. 3, for sending a measurement result report signal.

A wireless device 20 executes processing exemplified in a flowchart in FIG. 10. In this example, the wireless device 20 determines whether or not a discovery signal sent from another wireless device 20 is received (Step S101 in FIG. 10).

The wireless device 20 determines as "Yes" when a discovery signal is received, and measures a received power of the discovery signal. The wireless device 20 then sends a measurement result report signal indicating the measured received power (Step S102 in FIG. 10). The wireless device 20 then returns to Step S101 in FIG. 10, and repeatedly executes Step S101 and S102.

Otherwise, the wireless device 20 determines as "No" when no discovery signal is received in Step S101 in FIG. 10, and waits until a discovery signal is received.

Figure 11:
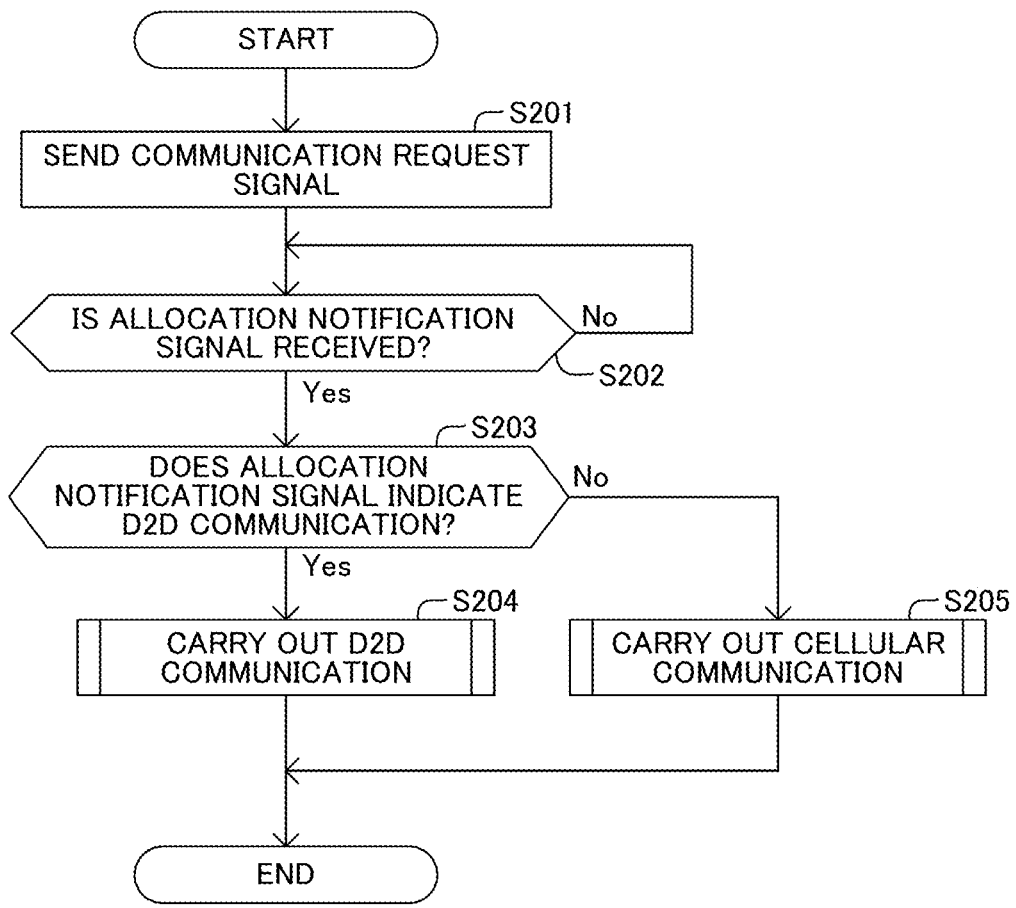
FIG. 11 is a flowchart illustrating one example of processing executed by the wireless device depicted in FIG. 3, for carrying out a D2D communication or a cellular communication.

The wireless device 20 also executes processing exemplified in a flowchart in FIG. 11. In this example, the wireless device 20 sends a communication request signal to the wireless base station 10 (Step S201 in FIG. 11). The wireless device 20 then waits until an allocation notification signal is received from any of the wireless base stations 10 (the "No" route from Step S202 in FIG. 11).

Figure 12:
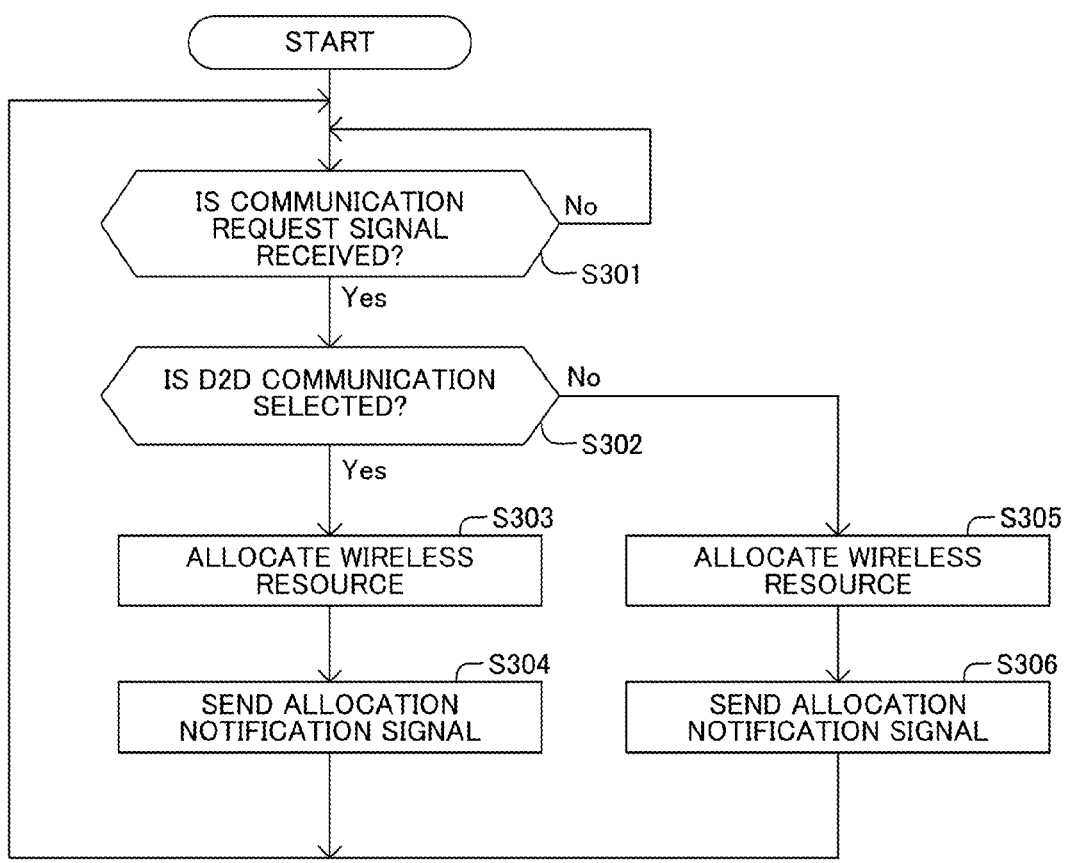
FIG. 12 is a flowchart illustrating one example of processing executed by the wireless base station depicted in FIG. 3, for allocating a wireless resource.

In the meantime, the wireless base station 10 executes processing exemplified in a flowchart in FIG. 12. In this example, the wireless base station 10 waits until a communication request signal is received from any of the wireless devices 20 (the "No" route from Step S301 in FIG. 12).

The wireless base station 10 determines as "Yes" when a communication request signal is received from a wireless device 20, and selects one of a D2D communication or a cellular communication based on the received measurement result report signal. The wireless base station 10 then determines whether or not a D2D communication is selected (Step S302 in FIG. 12).

Firstly, a scenario is assumed wherein the measurement result report signal indicates that the received power of the discovery signal that has been sent and received between two wireless devices 20 identified by the communication request signal is greater than a first threshold power. In this case, the wireless base station 10 selects a D2D communication. Hence, the wireless base station 10 determines as "Yes", and allocates a wireless resource to a D2D communication (Step S303 in FIG. 12). In this example, an allocation of a wireless resource for a D2D communication is achieved by determining the frequency band identifying the D2D communication resource.

The wireless base station 10 then sends an allocation notification signal for identifying the D2D communication resource, to the wireless device 20 that has sent the communication request signal (Step S304 in FIG. 12). Note that the wireless base station 10 may send the allocation notification signal to wireless device 20 identified by each device identifier contained in the communication request signal.

The wireless base station 10 then returns to Step S301, and repeatedly executes the processing from Step S301 to Step S306 that will be described later.

Next, another scenario is assumed wherein the measurement result report signal indicates that the received power of the discovery signal that has been sent and received between two wireless devices 20 identified by the communication request signal is not greater than the first threshold power. In this case, the wireless base station 10 selects a cellular communication.

Hence, the wireless base station 10 determines as "No" in Step S302 in FIG. 12, and allocates a wireless resource to a cellular communication (Step S305 in FIG. 12). The wireless base station 10 then sends an allocation notification signal identifying the allocated wireless resource, to the wireless device 20 that has been sent the communication request signal (Step S306 in FIG. 12).

The wireless base station 10 then returns to Step S301, and repeatedly executes the processing from Step S301 to Step S306.

In the meantime, the wireless device 20 determines as "Yes" in Step S202 in FIG. 11 when the allocation notification signal is received from the wireless base station 10, and determines whether or not the allocation notification signal indicates a D2D communication (Step S203 in FIG. 11).

When the allocation notification signal indicates a D2D communication, the wireless device 20 determines as "Yes" and carries out a D2D communication through the D2D communication resource (Step S204 in FIG. 11).

Otherwise, when the allocation notification signal does not indicate a D2D communication, the wireless device 20 determines as "No" in Step S203 in FIG. 11 and carries out a cellular communication (Step S205 in FIG. 11).

Thereafter, the wireless device 20 terminates the processing in FIG. 11.

Figure 13:
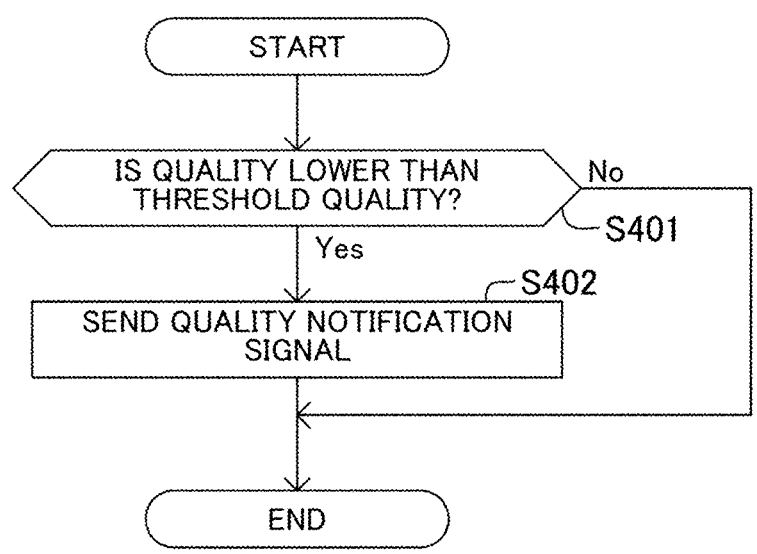
FIG. 13 is a flowchart illustrating one example of processing executed by the wireless device depicted in FIG. 3, for sending a quality notification signal.

In addition, the wireless device 20 executes processing exemplified in a flowchart in FIG. 13, while carrying out a D2D communication. In this example, the wireless device 20 repeatedly executes the processing in FIG. 13, at every certain cycle.

In this example, the wireless device 20 detects the quality of the D2D communication, and determines whether or not the detected quality is lower than the threshold quality (Step S401 in FIG. 13).

The wireless device 20 determines as "Yes" when the quality of the D2D communication is lower than the threshold quality, and sends a quality notification signal to the wireless base station 10 through a quality notification resource associated with the D2D communication resource (Step S402 in FIG. 13). The wireless device 20 then terminates the processing in FIG. 13.

Otherwise, the wireless device 20 determines as "No" in Step S401 in FIG. 13 when the quality of the D2D communication is not less than the threshold quality, and terminates the processing in FIG. 13 without sending a quality notification signal.

Figure 14:
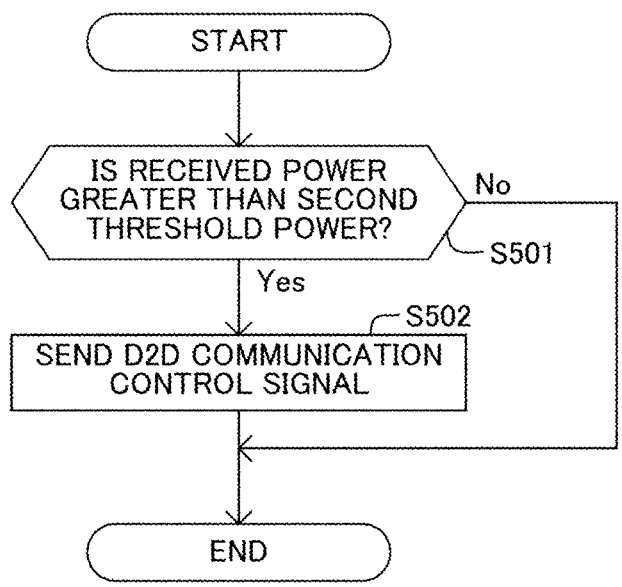
FIG. 14 is a flowchart illustrating one example of processing executed by the wireless base station depicted in FIG. 3, for sending a D2D communication control signal.

The wireless base station 10 further executes processing exemplified in a flowchart in FIG. 14, for each of D2D communication resources allocated by that wireless base station 10. In this example, the wireless base station 10 determines whether or not a received power for a quality notification resource associated with that D2D communication resource is greater than a second threshold power (Step S501 in FIG. 14).

The wireless base station 10 determines as "Yes" when the received power for the quality notification resource is greater than the second threshold power. The wireless base station 10 then sends a D2D communication control signal for inhibiting a D2D communication, through a D2D communication control resource associated with the D2D communication resource (Step S502 in FIG. 14). The wireless base station 10 then terminates the processing in FIG. 14.

Otherwise, the wireless base station 10 determines as "No" in Step S501 in FIG. 14 when the received power for the quality notification resource is not greater than the second threshold power, and terminates the processing in FIG. 14, without sending a D2D communication control signal.

Figure 15:
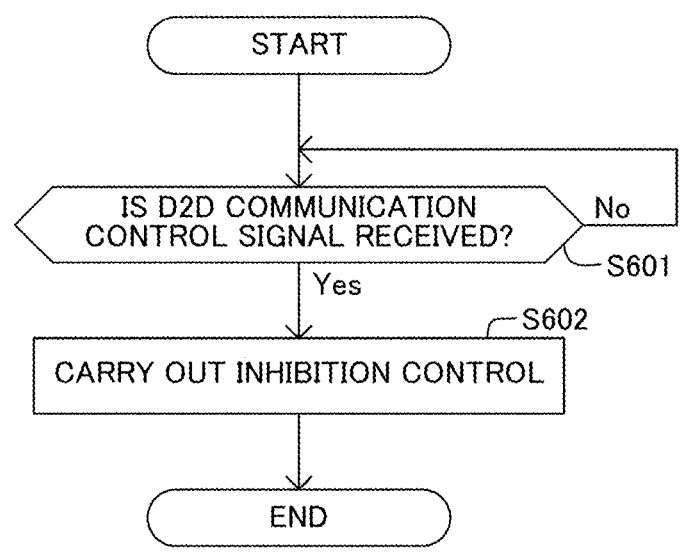
FIG. 15 is a flowchart illustrating one example of processing executed by the wireless device depicted in FIG. 3, for carrying out an inhibition control.

In addition, the wireless device 20 executes processing exemplified in a flowchart in FIG. 15, while carrying out the D2D communication. In this example, the wireless device 20 waits until a D2D communication control signal for inhibiting the D2D communication is received through the D2D communication control resource (the "No" route from Step S601 in FIG. 15).

The wireless device 20 determines as "Yes" when a D2D communication control signal for inhibiting the D2D communication is received, and executes an inhibition control (Step S602 in FIG. 15). The wireless device 20 then terminates the processing in FIG. 15.

Next, one example of an operation of the wireless communication system 1 will be described with reference to FIG. 16.

In this example, a scenario is assumed wherein the wireless base station 10-1 allocates a wireless resource common to three D2D communications, i.e., $1^{st}$-$3^{rd}$ D2D communications. The $1^{st}$-$3^{rd}$ D2D communications are carried out between wireless devices 20-3 and 20-4, between wireless devices 20-5 and 20-6, and between wireless devices 20-7 and 20-8, respectively.

Figure 16:
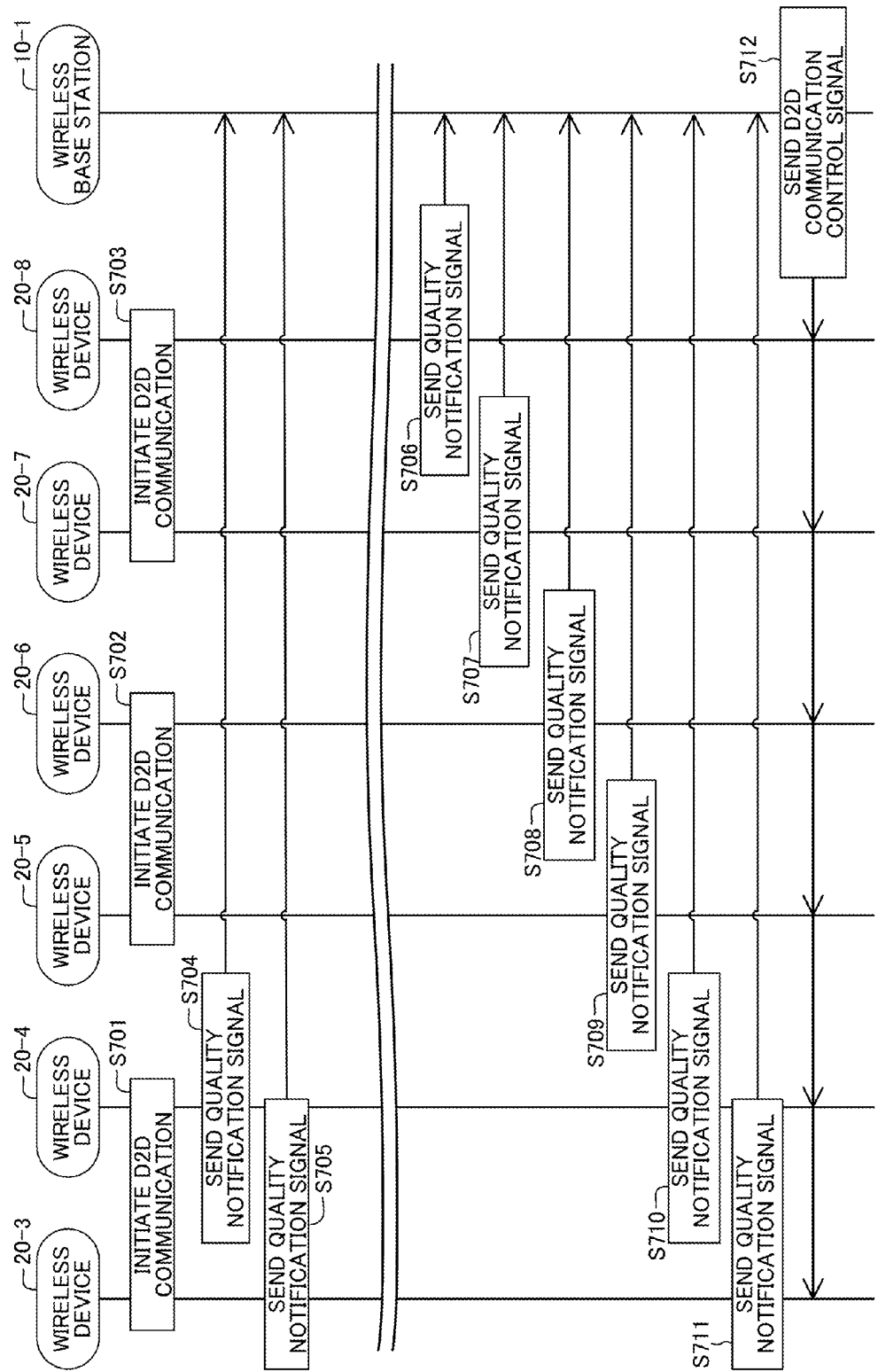
FIG. 16 is a sequence diagram illustrating one example of operations of the wireless communication system depicted in FIG. 3.

Accordingly, in this example, the wireless devices 20-3 and 20-4 initiate the $1^{st}$ D2D communication through the D2D communication resource (Step S701 in FIG. 16). Similarly, the wireless devices 20-5 and 20-6 initiate the $2^{nd}$ D2D communication through the D2D communication resource that is the same D2D communication resource used by the wireless devices 20-3 and 20-4 (Step S702 in FIG. 16). Similarly, the wireless devices 20-7 and 20-8 initiate the $3^{rd}$ D2D communication through the D2D communication resource that is the same D2D communication resource used by the wireless devices 20-3 and 20-4 (Step S703 in FIG. 16).

Thereafter, it is assumed that the quality of the $1^{st}$ D2D communication becomes lower than the threshold quality. In this case, each of the wireless devices 20-3 and 20-4 sends a quality notification signal to the wireless base station 10-1 through a quality notification resource associated with the D2D communication resource (Step S704 and S705 in FIG. 16).

It is assumed that the received power at the wireless base station 10-1 for the quality notification resource is not greater than the second threshold power at this point in time. Therefore, the wireless base station 10-1 sends no D2D communication control signal for inhibiting the D2D communication at this point in time.

Thereafter, it is assumed that the qualities of all of the $1^{st}$-$3^{rd}$ D2D communications become lower than the threshold quality. In this case, each of the wireless devices 20-7 and 20-8 sends a quality notification signal to the wireless base station 10-1, through the quality notification resource associated with the D2D communication resource (Steps S706 and S707 in FIG. 16). Similarly, each of the wireless devices 20-5 and 20-6 sends a quality notification signal to the wireless base station 10-1, through the quality notification resource that is the same quality notification resource used by the wireless devices 20-7 and 20-8 (Step S708 and S709 in FIG. 16). Similarly, each of the wireless devices 20-3 and 20-4 sends a quality notification signal to the wireless base station 10-1, through the quality notification resource that is the same quality notification resource used by the wireless devices 20-7 and 20-8 (Steps S710 and S711 in FIG. 16).

It is assumed that the received power at the wireless base station 10-1 for the quality notification resource becomes greater than the second threshold power at this point in time. Therefore, the wireless base station 10-1 sends a D2D communication control signal for inhibiting the D2D communication, through the D2D communication control resource associated with the D2D communication resource at this point in time (Step S712 in FIG. 16).

In response, each of the wireless devices 20-3 through 20-8 receives the D2D communication control signal for inhibiting the D2D communication through the D2D communication control resource. Each of the wireless devices 20-3 through 20-8 then executes an inhibition control. As a result, an interference of wireless signals among the $1^{st}$-$3^{rd}$ D2D communications can be inhibited. This increases the quality of the D2D communication.

As described above, in the wireless communication system 1 in accordance with the first embodiment, the wireless device 20 sends the wireless base station 10 a quality notification signal in accordance with a quality of a D2D communication through a D2D communication resource, through a quality notification resource associated with the D2D communication resource.

In this configuration, as compared to the configuration wherein different wireless resources are allocated to the respective wireless devices 20, it is possible to save the wireless resource allocated to sending of a quality notification signal that is sent in accordance with a quality of the D2D communication. As a result, an effective utilization of wireless resources is achieved in D2D communications.

Further, in the wireless communication system 1 in accordance with the first embodiment, the wireless base station 10 sends the wireless device 20 a D2D communication control signal to control the D2D communication, through a D2D communication control resource associated with the D2D communication resource.

In this configuration, as compared to the configuration wherein different wireless resources are allocated to the respective wireless devices 20, it is possible to save wireless resources allocated to sending of a D2D communication control signal to control the D2D communication. As a result, an effective utilization of wireless resources is achieved in D2D communications.

In addition, in the wireless communication system 1 in accordance with the first embodiment, the wireless device 20 sends a signal corresponding to "on" of an on-off keying, as a quality notification signal, through the quality notification resource, when the quality of the D2D communication is lower than the threshold quality. The wireless base station 10 further sends a D2D communication control signal for inhibiting the D2D communication through a D2D communication control resource, when a received power for the quality notification resource is greater than the second threshold power.

In this configuration, the received power at the wireless base station 10 for the quality notification resource suitably reflects the number of D2D communications having qualities lower than the threshold quality. As a result, the wireless base station 10 can suitably control D2D communications, in accordance with the number of D2D communications having qualities lower than the threshold quality.

Further, in the wireless communication system 1 in accordance with the first embodiment, a quality notification resource is cyclically allocated along the time line.

In this configuration, the wireless base station 10 can swiftly detect any deviation of the quality of the D2D communication over time. As a result, the wireless base station 10 can control D2D communications swiftly in accordance with the quality of the D2D communication, for example.

As described above, in the first embodiment, the wireless base station 10 sends a D2D communication control signal for inhibiting a D2D communication when a received power for a quality notification resource is greater than the second threshold power. Note that the wireless base station 10 may send a D2D communication control signal for inhibiting a D2D communication when a time duration during which the received power for the quality notification resource is greater than the second threshold power is longer than a certain threshold time duration.

Figure 17:
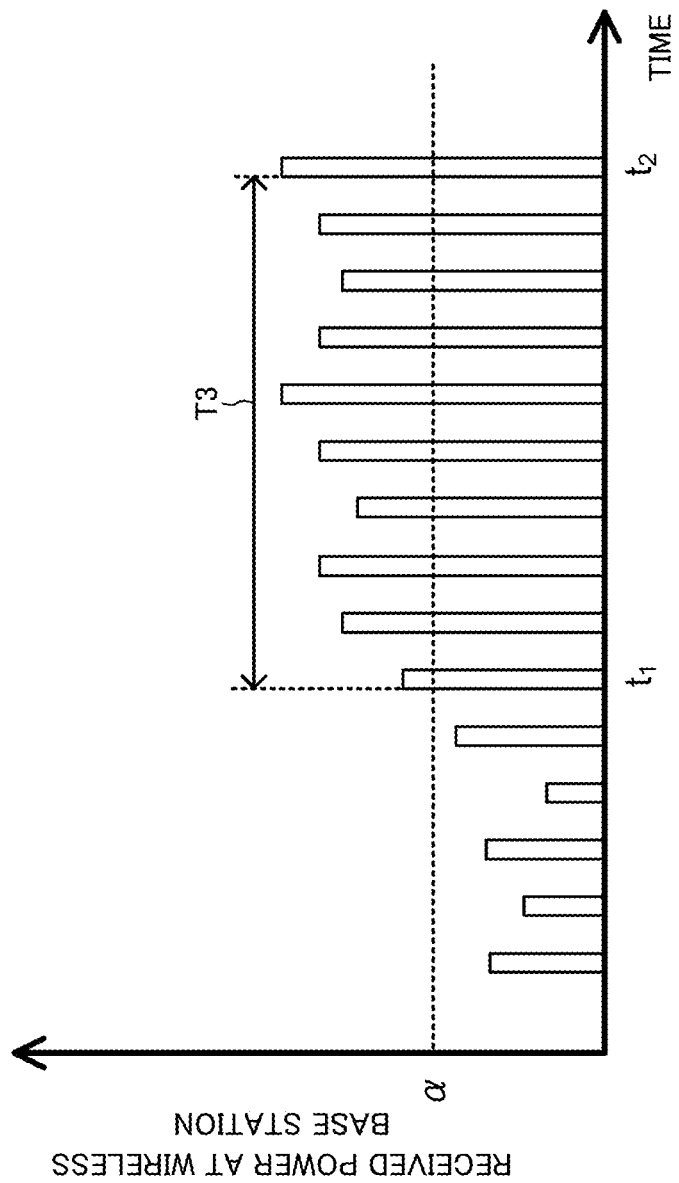
FIG. 17 is a graph illustrating one example of a deviation in a received power for a quality notification resource in a wireless base station.

For example, as depicted in FIG. 17, it is assumed that a received power at the wireless base station 10 for a quality notification resource becomes greater than a second threshold power $\alpha$ at the time point $t_1$. It is further assumed that the received power remains to be greater than the second threshold power $\alpha$ from the time point $t_1$ until the time point $t_2$ after a threshold time T3 from the time point $t_1$. In this case, the wireless base station 10 sends no D2D communication control signal for inhibiting the D2D communication before the time point $t_2$, and sends a D2D communication control signal for inhibiting the D2D communication at the time point $t_2$.

In this configuration, even when the received power at the wireless base station 10 for the quality notification resource deviates, the quality of the D2D communication can be detected highly precisely.

<Second Embodiment>

Next, a wireless communication system in accordance with a second embodiment of the present disclosure will be described. The wireless communication system in accordance with the second embodiment is different from the wireless communication system in accordance with the first embodiment in that a quality notification resource common to multiple D2D communication resources is allocated to sending of a quality notification signal. Hereinafter, the second embodiment will be described focusing on that difference. In the description of the second embodiment, elements denoted by the like reference symbols denote the elements that are the same as or substantially similar to those in the first embodiment.

Figure 18:
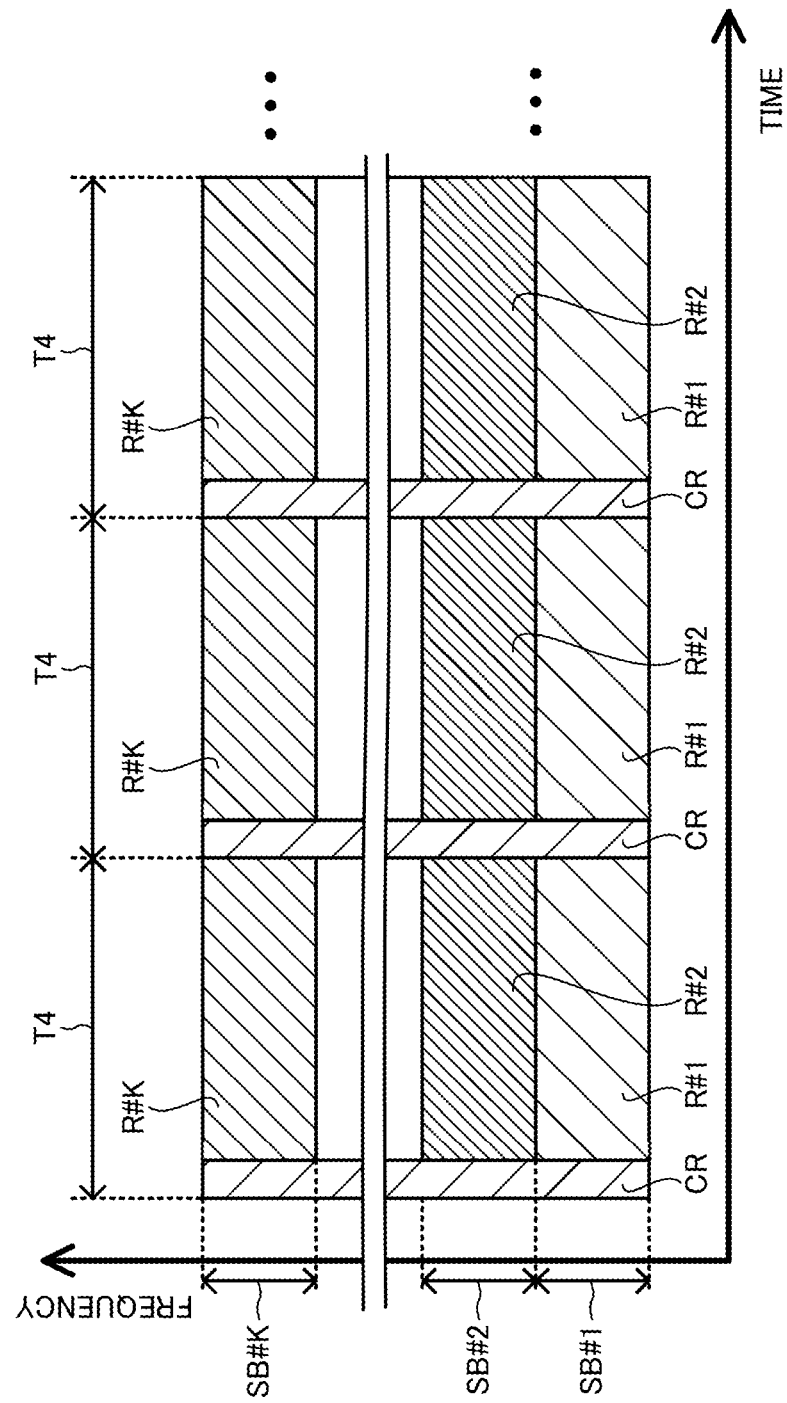
FIG. 18 is an illustrative diagram conceptually illustrating one example of an allocation of D2D communication resources and quality notification resources in a wireless communication system in accordance with a second embodiment.

In accordance with the second embodiment, as exemplified in FIG. 18, a wireless resource allocation unit 1033 determines the band identifiers identifying $1^{st}$-$K^{th}$ frequency bands SB#1-SB#K for $1^{st}$-$K^{th}$ D2D communications, respectively. In this example, K represents an integer of 2 or greater.

In this example, for multiple D2D communications by different communication pairs, the wireless resource allocation unit 1033 may determine a band identifier that is common to those multiple D2D communications. For example, the wireless resource allocation unit 1033 may determine a band identifier identifying the first frequency band SB#1, for each of a $1^{st}$ D2D communication and an $L^{th}$ D2D communication. L represents an integer greater than K.

In this example, D2D communication resources R#1-R#K for the $1^{st}$-$K^{th}$ D2D communications are identified by the $1^{st}$-$K^{th}$ frequency bands SB#1-SB#K, respectively.

Further, in this example, a quality notification resource CR that is common to the D2D communication resources R#1-R#K is associated with each of the D2D communication resources R#1-R#K for the $1^{st}$-$K^{th}$ D2D communications.

In this example, the quality notification resource CR is identified by a frequency band including the $1^{st}$-$K^{th}$ frequency bands SB#1-SB#K. Note that the quality notification resource CR may be identified by a part of a frequency band composed of the $1^{st}$-$K^{th}$ frequency bands SB#1-SB#K. For example, the quality notification resource CR may be identified by one of the $1^{st}$-$K^{th}$ frequency bands SB#1-SB#K. Alternatively, the quality notification resource CR may be identified by a frequency band different from the $1^{st}$-$K^{th}$ frequency bands SB#1-SB#K.

In this example, each of the D2D communication resources R#1-R#K is identified by a duration defined at every certain cycle T4. In other words, each of the D2D communication resources R#1-R#K is cyclically allocated along the time line. In other words, each of the D2D communication resources R#1-R#K is positioned cyclically along the time line. Further, in this example, the quality notification resource CR is identified by a duration defined at every cycle T4. In other words, the quality notification resource CR is cyclically allocated along the time line. In other words, the quality notification resource CR is positioned cyclically along the time line.

In this example, the quality notification resource CR is identified by the frequency band including the $1^{st}$-$K^{th}$ frequency bands SB#1-SB#K identifying the D2D communication resources R#1-R#K, and follows the D2D communication resources R#1-R#K.

In accordance with the second embodiment, the quality notification signal generating unit 2044 generates a known signal associated with a D2D communication resource, as a quality notification signal. For example, the known signal is a signal known by the wireless base station 10 and the wireless device 20. In this example, multiple known signals associated with multiple D2D communication resources associated with a certain quality notification resource are orthogonal to each other among the D2D communication resources. The known signal is generated using a Zadoff-Chu series, for example.

In accordance with the second embodiment, when a quality notification signal is generated, the transmission signal generating unit 204 outputs the quality notification signal to the transmission unit 205, without modulating the generated quality notification signal. The quality notification signal is output such that the quality notification signal is sent through the quality notification resource CR.

Otherwise, when no quality notification signal is generated, the transmission signal generating unit 204 outputs a blank signal to the transmission unit 205 such that the blank signal is sent through the quality notification resource. In this example, the transmission of the blank signal represents a transmission of a carrier wave without any modulation or a transmission of a predefined dummy signal.

In accordance with the second embodiment, the D2D communication control unit 1032 obtains a received power for the quality notification resource of a signal received by the reception unit 101, for each known signal. A received power for each known signal is one example of a received power for each D2D communication resource. The received power for the quality notification resource for each D2D communication resource increases as the number of wireless devices 20 sending a quality notification signal for each D2D communication resource increases.

The D2D communication control unit 1032 outputs a D2D communication control signal for inhibiting the D2D communication, to the transmission signal generating unit 104, when the obtained received power is greater than a certain second threshold power for each of the D2D communication resources. The D2D communication control unit 1032 does not output a D2D communication control signal for inhibiting the D2D communication when the obtained received power is smaller than the above-described second threshold power for each of the D2D communication resources.

The wireless communication system 1 in accordance with the second embodiment operates in the manner similar to the wireless communication system 1 in accordance with the first embodiment. Accordingly, the wireless communication system 1 in accordance with the second embodiment has advantages and effects that are similar to those of the wireless communication system 1 in accordance with the first embodiment.

In addition, in the wireless communication system 1 in accordance with the second embodiment, multiple wireless devices 20 send multiple quality notification signals that are orthogonal to each other through a quality notification resource CR, in accordance with qualities of multiple D2D communications through multiple D2D communication resources R#1-R#K, respectively.

In this configuration, the quality notification resource CR common to the multiple D2D communications is allocated to sending of multiple quality notification signals. As a result, an effective utilization of wireless resources is achieved in D2D communications.

According to the above disclosure, an effective utilization of wireless resources is achieved in multiple device-to-device communications through a common wireless resource.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A wireless communication system comprising:
a wireless base station; and
a plurality of wireless devices,
wherein one of the plurality of wireless devices sends a first signal to the wireless base station in accordance with a quality of a communication between the plurality of wireless devices communicating via a first wireless resource through a second wireless resource associated with the first wireless resource, wherein the one of the plurality of wireless devices sends a signal corresponding to ON in an on-off modulation as the first signal sent through the second wireless resource when the quality of the communication with one of the plurality of wireless devices is lower than a certain level of quality.

2. The wireless communication system according to claim 1, wherein the wireless base station sends the one of the plurality of wireless devices a second signal for controlling the communication between the plurality of wireless devices through a third wireless resource associated with the first wireless resource.

3. The wireless communication system according to claim 2, wherein the wireless base station sends a signal as the second signal through the third wireless resource to inhibit the communication between the plurality of wireless devices.

4. The wireless communication system according to claim 3, wherein the second signal contains information related to an adjustment of a transmission power of one or more wireless signals transmitted by the one of the plurality of wireless devices.

5. The wireless communication system according to claim 1, wherein the wireless resources are identified by time and frequencies, and the second wireless resource is periodically allocated in a time domain.

6. The wireless communication system according to claim 1, wherein the quality of the communication between the plurality of wireless devices is a signal to interference ratio (SIR) of a received wireless signal sent among the plurality of wireless devices, a signal-to-interference plus noise power ratio (SINR) of the received wireless signal sent among the plurality of wireless devices, or an indicator indicating channel quality that is obtained from a result of measurement of a received wireless signal sent among the plurality of wireless devices.

7. The wireless communication system according to claim 1, wherein the plurality of wireless devices send the respective first signals that are orthogonal to each other through the second wireless resource in accordance with a plurality of qualities of communications between the plurality of wireless devices with a plurality of wireless resources including the first wireless resource.

8. The wireless communication system according to claim 7, wherein the first signal is a Zadoff-Chu sequence.

9. A wireless device comprising:
a memory; and
a processor coupled to the memory and configured to:
detect a quality of a communication between a plurality of wireless devices communicating via a first wireless resource; and
transmit a first signal to a wireless base station in accordance with the detected quality through a second wireless resource associated with the first wireless resource, wherein the wireless device sends a signal corresponding to ON in an on-off modulation as the first signal sent through the second wireless resource when the detected quality of the communication between one the plurality of wireless devices is lower than a certain level of quality.

10. The wireless device according to claim 9, wherein the processor is further configured to receive a second signal transmitted by the wireless base station for controlling communication between the plurality of wireless devices, through a third wireless resource associated with the first wireless resource.

11. A wireless base station comprising:
a memory; and
a processor coupled to the memory and configured to:
control an allocation of a first wireless resource used for communication between a plurality of wireless devices; and
receive a first signal sent by one of the plurality of wireless devices in accordance with a quality of communication between the plurality of wireless devices communicating via the first wireless resource through a second wireless resource associated with the first wireless resource, wherein the one of the plurality of wireless devices sends a signal corresponding to ON in an on-off modulation as the first signal sent through the second wireless resource when the quality of the communication with the one of the plurality of wireless devices is lower than a certain level of quality.

12. The wireless base station according to claim 11, wherein the processor is further configured to transmit a second signal to at least one of the plurality of wireless devices through a third wireless resource associated with the first wireless resource, the second signal to control the communication between the plurality of wireless devices.

13. A method of communications by a wireless base station, the method comprising:
- controlling an allocation of a first wireless resource for communication between a plurality of wireless devices; and
- receiving a first signal sent from one of the plurality of wireless devices in accordance with a quality of the communication between the plurality of wireless devices communicating via the first wireless resource through a second wireless resource associated with the first wireless resource, wherein the one of the plurality of wireless devices sends a signal corresponding to ON in an on-off modulation as the first signal sent through the second wireless resource when the quality of the communication with one of the plurality of wireless devices is lower than a certain level of quality.

14. The method of communications by the wireless base station according to claim 13, further comprising:
- transmitting a second signal to the wireless device for controlling the communication between the plurality of wireless devices, through a third wireless resource associated with the first wireless resource.

* * * * *